June 15, 1948.   M. D. STEWART   2,443,331
BRAKE EQUALIZER
Filed June 4, 1945
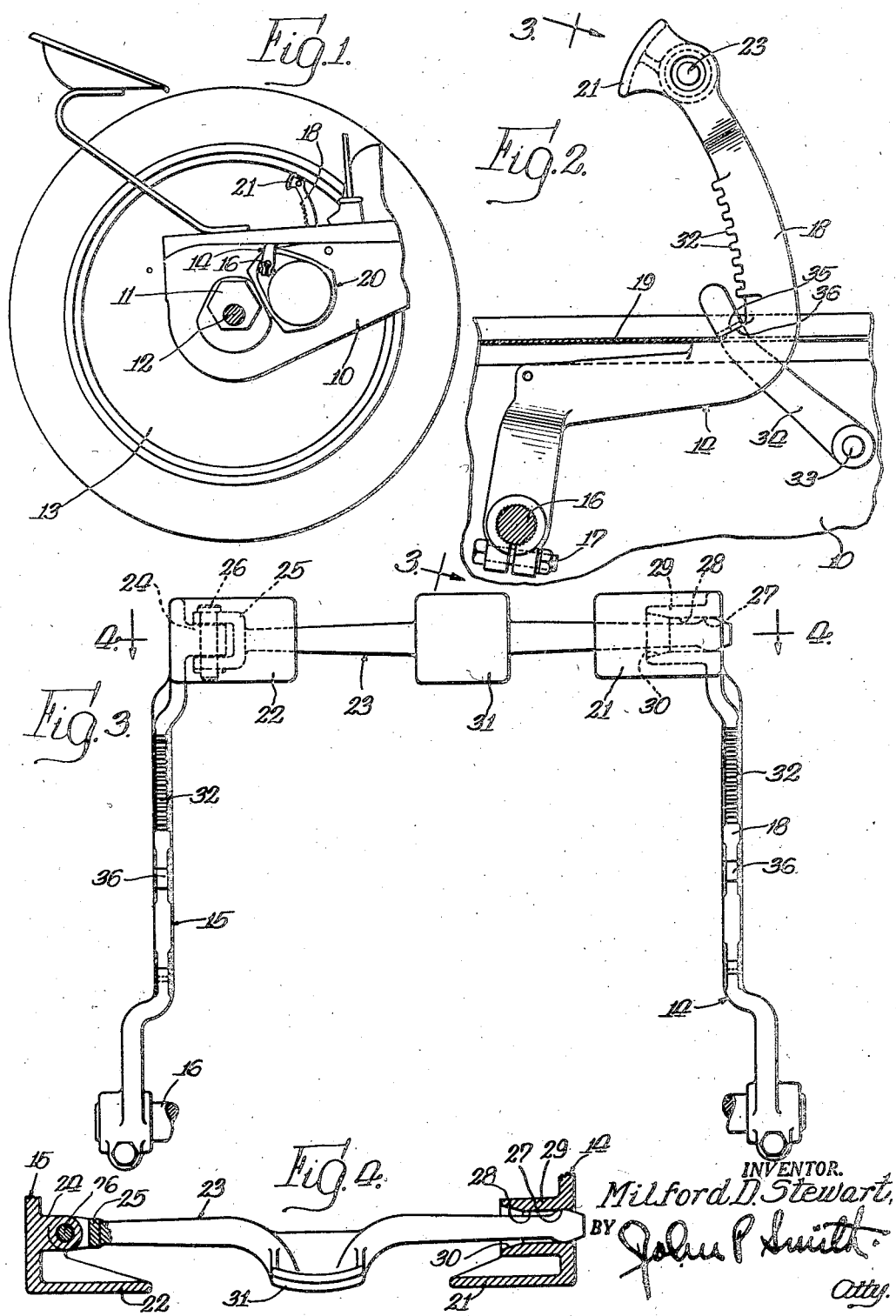
INVENTOR.
Milford D. Stewart,
BY John P. Smith
Atty.

Patented June 15, 1948

2,443,331

UNITED STATES PATENT OFFICE 2,443,331

BRAKE EQUALIZER

Milford D. Stewart, Charles City, Iowa, assignor to The Oliver Corporation, a corporation of Delaware Application June 4, 1945, Serial No. 597,526

3 Claims. (Cl. 74—480)

The present invention relates generally to braking mechanism for tractors and the like, but more particularly to a simple equalizing means operatively connected to the right and left hand braking foot pedals or levers for the separate traction wheels so that braking action may be either separately applied to each of the wheels or simultaneously and equally applied to both of the wheels.

Another object of the invention is to provide a simple and improved construction in the form of a single equalizing member positioned between the brake pedals or levers of the individual traction wheels so that by applying pressure to an intermediate portion of the equalizing member, the same is actuated to equalize and simultaneously apply braking action on both wheels.

These and other objects are accomplished by providing a construction and an arrangement of the various parts in the manner hereinafter described and particularly pointed out in the appended claims.

Referring to the drawings:

Fig. 1 is a fragmentary sectional side elevational view of a tractor having my invention embodied therein;

Fig. 2 is an enlarged fragmentary view partly in cross section showing the right foot lever for braking the right traction wheel;

Fig. 3 is a fragmentary rear elevational view taken on the line 3—3 in Fig. 2; and Fig. 4 is a reduced cross sectional view taken on the line 4—4 in Fig. 3.

Conventional tractors used for cultivating and similar operations on the farm are provided with separate braking mechanisms for each of the rear traction wheels so that they may be independently applied in order to assist in steering at the end of the field. When the top travel speed of these tractors which were usually mounted on steel wheels did not exceed six miles an hour, either one of the steering brakes could be used as a service brake to stop the tractor or hold the tractor in stationary position. However, with the advent of rubber tires and higher travel speeds, it became dangerous to use one of the steering brakes for a service brake. Experience has shown that severe application of one of the steering brakes of the tractor while the tractor is moving at these higher speeds will cause the front wheels to slide sideways and render the tractor out of control of the operator.

The present invention overcomes this difficulty by the simple expedient of a single member pivotally and operatively connected between the two foot pedals or levers of the respective braking mechanisms of the rear traction wheels so that upon the application of pressure on the equalizing member, the two foot levers of the individual braking mechanisms are simultaneously depressed with an equalized pressure to effectively brake the two rear wheels.

The present equalizing braking mechanism may be used in connection with brake drums directly attached to the rear traction wheels or rear axle sections or may be used in connection with brake drums attached to the final drive pinions. In this connection I have shown one illustration of the application of my invention in Fig. 1 of the drawings in which a fragmentary portion of the main frame of the tractor is generally indicated by the reference character 10. Secured to the main frame 10 and extending in opposite directions therefrom are axle housings 11. Journaled in the main frame and axle housings 11 are the usual rear axle sections 12, only one of which is shown in the drawings. Secured to the outer ends of each of the rear axle sections are right and left rear traction wheels 13, only one of which is shown in the drawings. The braking mechanism of the present invention includes individual right and left hand foot pedals or levers indicated respectively by the reference characters 14 and 15. Each of these levers is secured to the serrated ends of the respective brake cam shafts 16 by means of clamp bolts 17. Each of the foot levers or pedals is offset forwardly and has an arcuately and upwardly projecting portion, as shown at 18, which protrudes through an opening on each side of an overhanging foot board 19 supported on the tractor frame 10. Each individual cam shaft is provided with the usual cam, which in turn is adapted to actuate its respective brake band for braking the final drive pinion. Each of these pinions, in turn, meshes with and operatively drives the bull gears secured to the individual rear axle sections in a manner well understood in the art. This braking mechanism is of the more or less conventional type and is mounted within the housing generally indicated by the reference character 20. As an illustration of the braking mechanism to which my novel equalizing means may be attached, reference to the patent to O. R. Schoenrock, No. 1,956,253, dated April 24, 1934, on Tractor construction may be had. The upper or free ends of the brake levers 14 and 15 are provided with inwardly projecting foot pads 21 and 22 respectively for forming a support for the foot of the operator. Pivotally attached to the left hand foot lever 15 through the medium of an apertured ear 24 formed on the upper end of the lever is an equalizing member, generally indicated by the reference character 23. One end of this equalizing member 23 is provided with a bifurcated portion as shown at 25. This bifurcated portion is provided with aligned apertures and adapted to receive a pin 26 for pivotally connecting the member 23 with the apertured ear 24 of the lever 15. The other end of the equalizing member 23 has a rounded or spherical-like end 27 which is adapted to slidably and oscillatably move in a horizontal aperture 28 formed in a sleeve 29. The sleeve 29 is formed integrally with the lever 14 at a point rearwardly of the foot pad 21. The aperture or bore 28 of the sleeve 29 tapers or flares outwardly as shown at 30 so as to allow for the free movement of the equalizing member 23 whenever either foot lever 14 or 15 are separately depressed. Located in the approximate center of the equalizing member 23 is a treadle or foot pad 31. The foot pad 31 has an arcuate or curved surface as shown in Fig. 4 of the drawings to permit the equalizing member 23 to rock on the operator's foot. Each of the foot levers 14 and 15 is provided with a series of teeth 32 located along the rear arcuate edge or curved portion 18 of each of the levers. Pivoted to each side of the tractor frame 10 as shown at 33 are hand operated locks or levers 34 which extend upwardly adjacent each of the levers 14 and 15 as clearly shown in Fig. 2 of the drawings. Each of these locking levers 34 has an offset portion as shown at 35 which lies in the path of and is adapted to engage an angularly flat portion as shown at 36 of each of the levers for forming a stop for the upward movement of the respective levers. This offset portion 35 is also adapted to engage the teeth 32 on the foot pedal for locking the braking mechanism of the tractor when in stopped position. With this arrangement, obviously the lock may be placed on both traction wheels by depressing the individual levers and actuating the respective locks 34.

Summarizing the advantages and functions of operation of my improved equalizing brake mechanism, it will be obvious that in making a turn at the end of the field either to the right or to the left, the brake pedal on that side of the turn may be depressed to expedite the turning without interfering with the braking mechanism on the other side. However, when it is desired to simultaneously apply equal pressure on both braking mechanisms of both rear traction wheels, the operator may depress the foot pad or treadle 31 of the equalizer bar or member 23 and the pressure will be equally applied to both braking mechanisms to stop the tractor.

In this connection it will also be observed that if one braking mechanism is slightly worn more than the other so that one lever will be required to be depressed further than the other lever to attain the same simultaneous braking action on both wheels, the curved foot pad 31 will rock on the foot of the operator to secure an equalized pressure on both braking mechanisms.

In this connection it will be noted that equalized braking of both wheels is accomplished by the simple expedient of a single member operatively connected between the free ends of the conventional individual brake levers without interfering with their normal operation of applying braking action individually to the right or left traction wheel in the event such action is required on the part of the operator for steering purposes.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent is:

1. The combination with separate operable brake levers for the braking of the separate traction wheels of a motor vehicle, a foot depressible member pivotally connected on a fixed pivot at one end to one of said levers, and slidably connected at the other end thereof to the other of said levers, and a curved foot pad located in the center of said member for engagement of the foot of the operator whereby upon the actuation of said foot pad by the operator, equalized pressure may be simultaneously applied to said levers.

2. Control means for a pair of brakes providing for the independent and simultaneous operation thereof, comprising a pair of levers, a single member pivoted at one end to one of said levers and slidably connected at the other end to the other of said levers, and a curved foot pad located in the approximate center of said member whereby said member may be depressed to simultaneously apply equal braking pressure on both of said braking mechanisms.

3. Control means for a pair of braking mechanisms providing for the independent and simultaneous operation thereof comprising separate foot operating levers for each of said braking mechanisms, a foot operated equalizing member operatively connected to said levers whereby said foot levers may be simultaneously actuated by depressing said equalizing member, and a curved foot pad located in the center of said member, whereby said member may rock on the operator's foot when said member is depressed.

MILFORD D. STEWART.

REFERENCES CITED

The following references are of record in the file of this patent:

UNITED STATES PATENTS

| Number | Name | Date |
|---|---|---|
| 1,137,166 | Peirce | Apr. 27, 1915 |
| 1,420,290 | Schofield | June 20, 1922 |
| 1,584,358 | Dement | May 11, 1926 |
| 2,287,011 | Beebe | June 23, 1942 |
| 2,383,690 | Sklovsky et al. | Aug. 28, 1945 |

FOREIGN PATENTS

| Number | Country | Date |
|---|---|---|
| 440,735 | Germany | Feb. 9, 1927 |
| 138,251 | Switzerland | May 1, 1930 |